T. E. MURRAY.
METHOD OF ELECTRICALLY WELDING THE END OF A TUBE WITHIN A SLEEVE OR SOCKET.
APPLICATION FILED DEC. 14, 1916.
1,219,139. Patented Mar. 13, 1917.
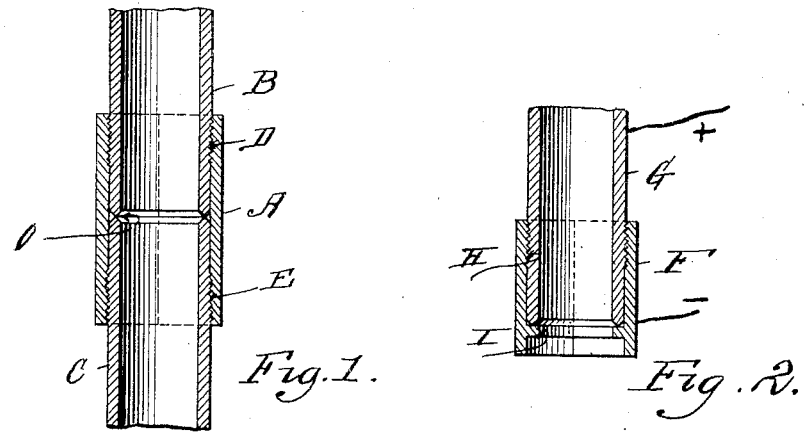
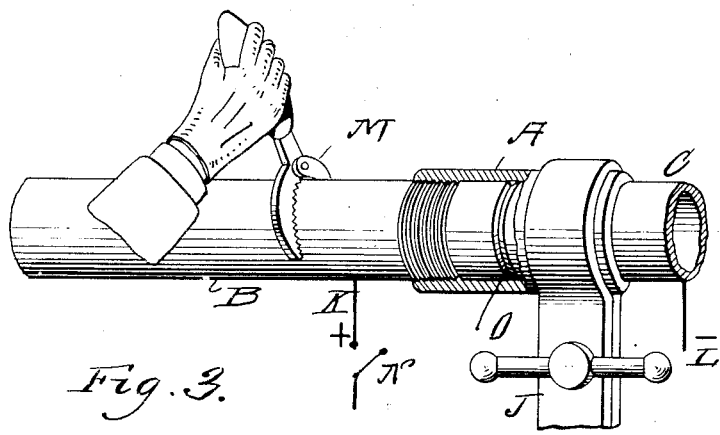
Inventor
Thomas E. Murray
By his Attorney

UNITED STATES PATENT OFFICE.

THOMAS E. MURRAY, OF NEW YORK, N. Y.

METHOD OF ELECTRICALLY WELDING THE END OF A TUBE WITHIN A SLEEVE OR SOCKET.

1,219,139.   Specification of Letters Patent.   Patented Mar. 13, 1917.

Application filed December 14, 1916. Serial No. 136,859.

*To all whom it may concern:*

Be it known that I, THOMAS E. MURRAY, a citizen of the United States, residing at New York, in the county of New York and State of New York, have invented a certain new and useful Improvement in Methods of Electrically Welding the End of a Tube Within a Sleeve or Socket, of which the following is a specification.

The invention is a method of electrically welding the end of a tube within a sleeve or socket.

In the accompanying drawings—

Figure 1 shows two tubes externally threaded and engaging in corresponding internal threads in a sleeve coupling. Fig. 2 shows one tube externally threaded and engaging in corresponding internal threads in a sleeve. Fig. 3 illustrates my welding method, hereinafter explained.

Similar letters of reference indicate like parts.

A, Fig. 1, is a sleeve coupling. B and C are two externally threaded tubes respectively engaging in the threads D, E in said coupling. F, Fig. 2, is a socket, reinforcing ring or the like, to be connected to the end of tube G. Said socket is internally threaded at H, and tube G is externally threaded to engage with the thread in said socket. Within socket F is a rib I, against which the end of tube G abuts.

In Fig. 1, the ends of the tubes B, C abut one against the other. The object is to electrically weld together the abutting ends of tubes B, C, or the end of tube G and the rib I.

In the first case, I proceed as follows: One of the tubes, as C, is screwed into the sleeve A as far as may be desired. Sleeve A being clamped in a vise J or otherwise firmly held, tube B is introduced into sleeve A and screwed in until nearly in contact with the end of tube C. The circuit terminals K, L from any suitable source of welding current have already been connected respectively to tubes B and C. A wrench M in the hand of the operator is applied to tube B. A switch N is closed to establish the welding current, and the operator immediately turns the tube B to force it into contact with tube C. This pressure occurs while the current is passing at the welding joint O, and causes an intimate union of the softened metal.

In the case of Fig. 2, the circuit terminals are connected to tube G and socket F. The socket is held in any suitable vise or other support, and the wrench is applied to tube G to force the end thereof into contact with the rib I while the welding current is passing, as before.

I claim:

The method of electrically butt-welding a threaded tube to a shoulder within a threaded sleeve, which consists in engaging said tube in said sleeve and moving the said tube into contact with said shoulder, establishing welding current to the joint, and rotating said tube to press the end thereof against said shoulder during the passage of the welding current.

In testimony whereof I have affixed my signature in presence of two witnesses.

THOMAS E. MURRAY.

Witnesses:
GERTRUDE T. PORTER,
MAY T. McLARRY.